United States Patent [19]

Inoue et al.

[11] Patent Number: 4,567,046
[45] Date of Patent: Jan. 28, 1986

[54] BREAD OR OTHER CEREAL-BASED FOOD IMPROVER COMPOSITION INVOLVING THE ADDITION OF PHOSPHOLIPASE A TO THE FLOUR

[75] Inventors: Seijiro Inoue, Machida; Shigenori Ota, Komae, both of Japan

[73] Assignee: Kyowa Hakko Kogyo Co., Ltd., Tokyo, Japan

[21] Appl. No.: 548,514

[22] Filed: Nov. 3, 1983

[30] Foreign Application Priority Data

Nov. 10, 1982 [JP] Japan .................................. 57-197098

[51] Int. Cl.$^4$ ............................................... A21D 8/04
[52] U.S. Cl. ..................................................... 426/20
[58] Field of Search ........................... 426/20; 435/186

[56] References Cited

U.S. PATENT DOCUMENTS 3,368,903  2/1968  Johnson et al. ........................ 426/20
3,520,702  7/1970  Menzi ..................................... 426/44

OTHER PUBLICATIONS

Derwent Abstract of Japanese Pat. No. J55-153549.

Primary Examiner—Sam Rosen
Attorney, Agent, or Firm—Antonelli, Terry & Wands

[57] ABSTRACT

Disclosed are a bread or other cereal-based food improver composition containing phospholipase A as the effective ingredient said phospholipase A being substantially free of lipase and protease.

8 Claims, No Drawings

BREAD OR OTHER CEREAL-BASED FOOD IMPROVER COMPOSITION INVOLVING THE ADDITION OF PHOSPHOLIPASE A TO THE FLOUR

The present invention relates to a bread improver and a process for producing bread using this improver. More particularly, the invention relates to a bread improver having phospholipase A (hereinafter referred to as PL-A) as the effective ingredient, as well as a process for producing bread characterized by the steps of adding this improver to the ingredients of dough and of kneading the dough to enhance the properties of the dough as well as the properties of the bread obtained from the dough and to the improved bread.

Also, the present invention relates to another cereal-based food improver containing PL-A in an amount more than 150 units per kg of cereal flour. As the other cereal-based food which is produced by treating the cereal flour dough, Udon (wheat noodles), Soba (buckwheat noodles), Chinese noodles, macaroni, spaghetti, skins for Chinese ravioli and shao-mai, etc. are mentioned.

A heretofore-known process for obtaining elastic and less sticky pasta by employing a pancreatin preparation, which is a commercially available raw material for PL-A, is disclosed in U.S. Pat. No. 3,520,702 (1970). According to the U.S. Pat. No. 3,520,702, the amount of pancreatin to be used is 2-100 mg per kg of cereal flour and the most effective amount is 25 mg. Even though a commercially available pancreatin preparation having the highest PL-A activity is employed, the corresponding most effective PL-A activity is at most 25 units (please see Table 1). Furthermore, the pancreatin preparation of the U.S. patent is immediately used without acidic heating treatment, and there is no teaching that the pancreatin preparation is applicable to breadmaking.

TABLE 1

| Pancreatin Preparation (Name of Manufacturer) | PL-A Activity (units/g) |
| --- | --- |
| No. 1 (Tokyo Kasei) | 1000 |
| No. 2 (Novo) | 560 |
| No. 3 (Kyowa-Miles) | 960 |
| No. 4 (Kyokuto Seiyaku) | 310 |

Making of bread necessitates mechanical operations such as kneading the dough, dividing the dough into pieces, and molding the dough pieces into a desired form. The physical properties of the dough, for example, elasticity, extensibility, non-stickiness and moldability, have effects on the quality of the finished baked product. The quality of bread can be developed by improving these properties. The quality of bread is assessed by such indices as taste, flavor, mouth feel, volume and inner structure.

Currently, various improvers are available for development of the quantity of bread by improving the physical properties of the dough. The improver is exemplified by emulsifiers such as monoglycerides and calcium stearoyl lactylate, oxidizing or reducing agents such as potassium bromate, ascorbic acid and cysteine, and enzymes such as protease, amylase and lipase. However, there has always been a need for the development of bread improvers having satisfactory effects.

As for other cereal-based food, with the change in the modes of their production, distribution, consumption, etc. there has always been a demand for the development of other cereal-based food improver having good quality.

The present inventors have made various studies of a method of making bread of good quality. As the result, they have found that this end is achieved by adding PL-A to the ingredients of dough and then kneading the dough. If necessary, phospholipase D (hereinafter referred to as PL-D), soybean, lecithin, emulsifiers, or oxidizing or reducing agents may be used together with PL-A.

As the result of various studies of other cereal-based food improver, it has now been found that by subjecting phospholipids in cereal flour to the action of PL-A, the properties of cereal flour dough are enhanced and the quality of the finished product is improved.

The present invention is described in more detail below.

PL-A is a well-known enzyme which is widespread in animals and microorganisms and it may be used in the present invention irrespective of its origin. Usually, easily available PL-A of commercial origin is employed. A possible source of PL-A is pancreatin originating from animals such as swine and bovine, but pancreatin contains not only PL-A but also protease and lipase. The latter enzymes, in particular protease rather inhibit PL-A from improving the quality of bread and other cereal-based food. Therefore, if pancreatin is used as a PL-A source, any protease and lipase must be inactivated.

The inactivation of protease and lipase contained in pancreatin is accomplished by heating an aqueous acidic dispersion of pancreatin. The desirable conditions are as follows:

Pancreatin concentration: 10–20%(w/w)
pH: 1.5–4.0
Heating temperature: 70°–90° C.
Heating time: 10–40 min.

The heat-treated pancreatin may be immediately used as a bread or other cereal-based food improver, but preferably it is dried and ground into powders which are stable longer and easier to handle. A dry powder of pancreatin may be produced by freeze-drying or spray-drying.

In the case of bread, the amount of PL-A to be used according to the present invention depends on the quality of wheat flour, the type of finished baked product, the method of breadmaking, the proportions of the ingredients and how much improvement of the bread quality is required. Generally, 10 to 5000 units of phospholipase A are used per kg of wheat flour. Pancreatin is preferably used in an amount of 0.001 to 0.5%(w/w) (10–5000 units in terms of PL-A) on the basis of wheat flour. In case of other cereal-based food, 150 to 5000 units of PL-A are used per kg of cereal flour.

PL-A is usually added to the ingredients of dough for bread prior to the mixing thereof. Alternatively, PL-A may be mixed with either wheat flour or a baker's flour mix containing various auxiliary ingredients. The alternative method has the advantage in that the need for weighing PL-A and adding a suitable amount of PL-A to the ingredients of dough every time the breadmaking is done is saved, and in that the gradual enzymatic reaction is performed during storage to thereby expect a greater ability of PL-A to improve the quality of bread. The advantage is another aspect of the present invention.

The effect of PL-A manifests itself in the physical properties of dough for bread. This enzyme provides the dough with a suitable degree of elasticity and extensibility, and suppresses its stickiness. As the result, the dough comes easy to handle in the subsequent operations. Furthermore, the volume of the finished product is increased, its interior has a well stretched structure in film form, and the finished product has a suitable degree of softness.

In the case of other cereal-based food, by the addition of PL-A, the mechanical durability of the dough is improved, the yield on boiling or steaming of dough is enhanced and the palatability after heating is improved.

PL-D is a well-known enzyme which is widespread in plants. It is known that the enzyme occurs in wheat flour with only just low activity. Any PL-D that occurs in plants may be used in the present invention, but usually, easily available one of commercial origin is employed. Other PL-D sources include vegetable juices such as carrot juice. Preferably, PL-D is used in an amount of 100 to 5,000 units per kg of wheat flour in breadmaking.

Soybean lecithin, emulsifiers, or oxidizing or reducing agents are utilized in combination with PL-A in breadmaking. Soybean lecithin is generally used in an amount ranging from 0.05 to 1% (w/w) of wheat flour; the emulsifier is preferably used in an amount ranging from 0.05 to 0.5% (w/w) of wheat flour; and the oxidizing or reducing agent is used with advantage in an amount ranging from 0.0005 to 0.01% (w/w) of wheat flour. Suitable emulsifiers include monoglycerides and calcium stearoyl lactylate, and suitable oxidizing or reducing agents include potassium bromate, ascorbic acid and cysteine.

The bread improver according to the present invention may be used in the production of bread by either the sponge-dough process or the straight process. Where the sponge-dough process is applied, PL-A and if necessary PL-D, soybean lecithin, emulsifiers, or, oxidizing or reducing agents are added to at least one of the sponge mix mostly comprising wheat flour, baker's yeast and yeast food, and the dough mix mostly comprising the remaining wheat flour, salt, sugar and shortening. It is desired that PL-A and PL-D are preliminarily added to the sponge mix.

Breadmaking by the sponge-dough process proceeds as follows. Water is added to the sponge mix mostly comprising wheat flour, baker's yeast and yeast food, and the ingredients are mixed and kneaded into a sponge which is fermented at 25°–35° C. for 2–5 hours (sponge fermentation). The fermented sponge is mixed with the dough mix mostly comprising the remaining wheat flour, salt, sugar and shortening and to the mixture is added water, and the resulting ingredients are mixed and kneaded into a dough. The dough is allowed to rest for 10–40 minutes (floor time) at 25°–35° C. The dough is then divided into pieces of suitable size and is allowed to rest for 10–30 minutes (bench time) at 15°–35° C. Subsequently, the dough pieces are molded and put into pans. The pieces are subjected to final fermentation at 35°–45° C. until they rise to a predetermined height. Thereafter, the dough pieces are baked at 180°–240° C. for 10–30 minutes.

Breadmaking by the straight process proceeds as follows. Water is added to the ingredients of dough mostly comprising wheat flour, salt, sugar, shortening and yeast food, and the mixture is kneaded into a dough. The dough is fermented at 25°–35° C. for 60–180 minutes. The dough is then divided into pieces of suitable size and is allowed to rest for 10–30 minutes (bench time) at 15°–35° C. Subsequently, the dough pieces are molded and put into pans. The pieces are subjected to final fermentation at 35°–45° C. until they rise to a predetermined height. Thereafter, the dough pieces are baked at 180°–240° C. for 10–30 minutes.

The bread produced according to the present invention by either method has a large volume and is suitably soft, and its interior is characterized by a well stretched structure in film form. In addition, the bread can be stored for an prolonged period without undergoing much staling.

Lecithin has already been employed as a quality improver for other cereal-based food. Combination of PL-A and lecithin promotes PL-A to improve the quality of dough.

Certain specific embodiments of the present invention are illustrated by the following representative examples and reference examples where "%" refers to wt. %, unless otherwise indicated.

EXAMPLE 1

Bread loaves were produced by a process consisting of the following steps.

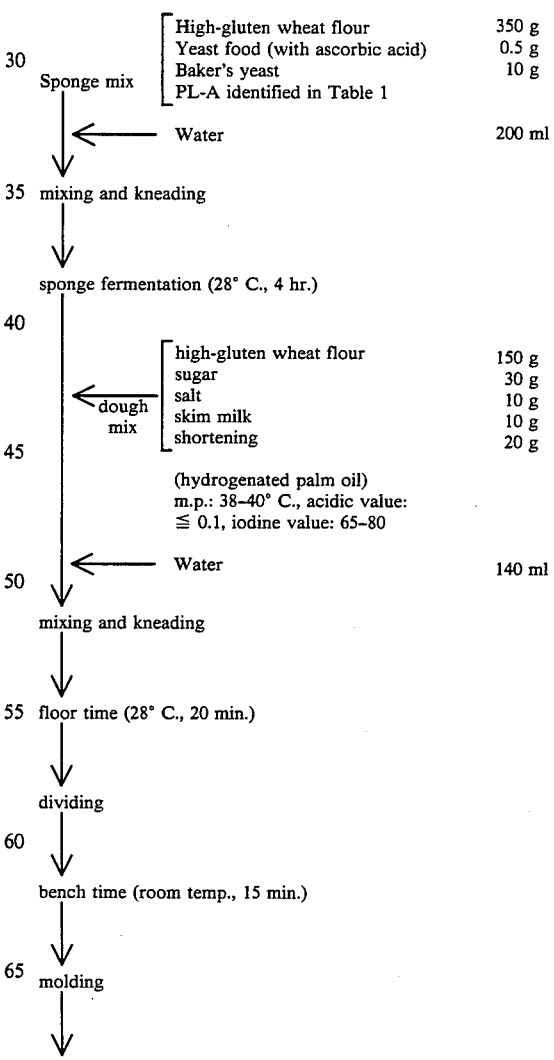

-continued proofing (40° C., 50 min.)
↓
baking (220° C., 25 min.)
↓
bread

TABLE 2

| Test group | Additive | Amount (units/kg wheat flour) |
|---|---|---|
| I | No additive | |
| II | Bee toxin PL-A (Lot No. P2509 produced by Sigma Chemical Company) | 200 |
| III | Swine pancreas PL-A (Lot No. P9139 produced by Sigma Chemical Company) | 200 |

Table 3 shows the physical properties of the dough of each test group during breadmaking, as well as the quality of each bread stored at 20° C. for 48 hours after its production.

TABLE 3

| | Test group | | |
|---|---|---|---|
| | I | II | III |
| Physical properties of dough | | | |
| elasticity | | | |
| extensibility | X | | |
| non-stickiness | X | | |
| moldability | Δ | | |
| Bread quality | | | |
| specific volume | 4.63 | 4.75 | 4.77 |
| film stretching in inner structure | X | | |
| texture of inner structure | Δ | | |
| flavor | | | |
| relative staleness | 100 | 91 | 90 |

(Notes)
I. Rating index (for organoleptic test by skilled engineers);
Very good ...
Good ...
Moderate ... Δ
Poor ... X
Impossible to evaluate ... —
II. Specific volume: Measured by the rapeseed displacement method
III. Relative staleness: Measured with a baker's compressimeter and expressed with the value of the control being taken as 100.

As compared with the control (test group I), test groups II and III were characterized by good physical properties of dough, high specific volume, improved inner structure and retardation of becoming stale. Hence, it is concluded that PL-A is effective as a bread improver.

EXAMPLE 2

The procedure of Example 1 was repeated except that the PL-A samples listed in Table 2 were replaced by PL-A prepared from heat-treated pancreatin or untreated pancreatin identified in Table 4. The physical properties of the dough of each test group during breadmaking and the quality of each bread stored at 20° C. for 48 hours after its production are shown in Table 5.

TABLE 4

| Test group | Addition | Amount (%) (to whole wheat flour) | PL-A (units/kg wheat flour) |
|---|---|---|---|
| I | No additive | | |
| II | PL-A (prepared in Ref. Ex. 1) | 0.02 | 76 |
| III | PL-A (prepared in Ref. Ex. 1) | 0.04 | 152 |
| IV | Untreated pancreatin | 0.01 | 71 |
| V | Untreated pancreatin | 0.02 | 142 |

TABLE 5

| | Test group | | | | |
|---|---|---|---|---|---|
| | I | II | III | IV | V |
| Physical properties of dough | | | | | |
| elasticity | | | | X | — |
| extensibility | X | | | X | — |
| non-stickiness | X | | | X | — |
| moldability | Δ | | | X | — |
| Bread quality | | | | | |
| specific volume | 4.56 | 4.67 | 4.74 | 3.92 | — |
| film stretching in inner structure | X | | | X | — |
| texture of inner structure | Δ | | | X | — |
| flavor | | | | X | — |
| relative staleness | 100 | 93 | 88 | 106 | — |

(Note) The same method of evaluation as in Ex. 1 was applied.

From the results of Table 5, test groups II and III were characterized by good physical properties of dough, high specific volume, improved inner structure and retardation in becoming stale, and had the high effectiveness as a bread improver. On the other hand, the dough of test group IV was badly damaged by protease and no high-quality bread could be made of the dough. The dough of test group V was so considerably damaged that no bread could be made of the dough.

EXAMPLE 3

The procedure of Example 1 was repeated except that the PL-A samples listed in Table 2 were replaced by PL-A prepared from heat-treated pancreatin and/or soybean lecithin listed in Table 6. The physical properties of the dough of each test group during breadmaking and the quality of each bread stored at 20° C. for 48 hours after its production are shown in Table 7.

TABLE 6

| Test group | Additive | Amount (%) (to whole wheat flour) | PL-A (units/kg wheat flour) |
|---|---|---|---|
| I | No additive | | |
| II | PL-A (prepared in Ref. Ex. 1) | 0.04 | 152 |
| III | Soybean lecithin paste (AY lecithin by Hohnen Oil Co., Ltd.) | 0.3 | |
| IV | PL-A (prepared in Ref. Ex. 1) | 0.04 | 152 |
| | Soybean lecithin paste | 0.3 | |

TABLE 7

| | Test group | | | |
|---|---|---|---|---|
| | I | II | III | IV |
| Physical properties of dough | | | | |
| elasticity | | | | |
| extensibility | X | | X | |

TABLE 7-continued

| | Test group | | | |
|---|---|---|---|---|
| | I | II | III | IV |
| non-stickiness | Δ | | Δ | |
| moldability | Δ | | Δ | |
| Bread quality | | | | |
| specific volume | 4.50 | 4.74 | 4.56 | 4.79 |
| film stretching in inner structure | X | | Δ | |
| texture of inner structure | Δ | | Δ | |
| flavor | | | | |
| relative staleness | 100 | 91 | 99 | 77 |

(Note) The same method of evaluation as in Ex. 1 was applied.

Samples of test group IV had even better physical properties of dough and more improved inner structure than those of other test groups, and showed a remarkable improvement in preventing the bread from becoming stale.

EXAMPLE 4

The procedure of Example 1 was repeated except that the PL-A samples listed in Table 2 were replaced by PL-A prepared from heat-treated pancreatin and/or PL-D enzyme preparations set forth in Table 8. The physical properties of the dough of each test group during breadmaking and the quality of each bread stored at 20° C. for 48 hours after its production are shown in Table 9.

TABLE 8

| Test group | Additive | Amount (%) (to whole wheat flour) | Enzyme (units/kg wheat flour) |
|---|---|---|---|
| I | No Additive | | |
| II | PL-D (made in Ref. Ex. 2) | 0.01 | 294 |
| III | PL-A (made in Ref. Ex. 1) | 0.08 | 304 |
| IV | PL-D (made in Ref. Ex. 2) | 0.01 | 294 |
| | PL-A (made in Ref. Ex. 1) | 0.08 | 304 |

TABLE 9

| | Test group | | | |
|---|---|---|---|---|
| | I | II | III | IV |
| Physical properties of dough | | | | |
| elasticity | | | | |
| extensibility | X | X | | |
| non-stickiness | X | | | |
| moldability | Δ | | | |
| Bread quality | | | | |
| specific volume | 4.48 | 4.59 | 4.70 | 4.71 |
| film stretching in inner structure | X | Δ | | |
| texture of inner structure | Δ | | | |
| flavor | | | | |
| relative staleness | 100 | 97 | 86 | 87 |

(Note) The same method of evaluation as in Ex. 1 was applied.

Test groups III and IV were characterized by improved physical properties of dough and better bread quality as compared with test groups I and II.

EXAMPLE 5

The procedure of Example 1 was repeated except that the PL-A samples shown in Table 2 and the high-gluten wheat flour as in ingredient of the sponge were replaced by the PL-A-containing high gluten wheat flour identified in Table 10. The physical properties of the dough of each test group during breadmaking and the quality of each bread stored at 20° C. for 48 hours after its production are shown in Table 11.

TABLE 10

| Test group | Additive |
|---|---|
| I | No additive |
| II | High-gluten wheat flour containing 0.01% PL-A prepared in Ref. Ex. 1: (as PL-A: 38 units/kg wheat flour) |
| III | High-gluten wheat flour containing 0.03% PL-A prepared in Ref. Ex. 1 (as PL-A: 114 units/kg wheat flour) |

TABLE 11

| | Test group | | |
|---|---|---|---|
| | I | II | III |
| Physical properties of dough | | | |
| elasticity | Δ | | |
| extensibility | Δ | | |
| non-stickiness | X | | |
| moldability | Δ | | |
| Bread quality | | | |
| specific volume | 4.82 | 4.88 | 4.97 |
| film stretching in inner structure | X | | |
| texture of inner structure | X | | |
| flavor | | | |
| relative staleness | 100 | 88 | 86 |

(Note) The same method of evaluation as in Ex. 1 was applied.

Test groups II and III were characterized by improved physical properties of dough and better bread quality as compared with test group I.

EXAMPLE 6

In this example, 500 g of the dough ingredients listed in Table 12 was mixed with 300 ml of water, and the mixture was kneaded into a dough. The dough was fermented at 28° C. for 120 minutes. The fermented dough was divided into pieces, which were rounded and allowed to rest at room temperature for 18 minutes. The dough pieces were shaped in a sheeter-molder, put into pans, and subjected to the final fermentation at 40° C. until they rose over the upper edge of the pan by 1.5 cm. Thereafter, the dough was baked at 220° C. for 25 minutes to make bread loaves.

Control bread loaves were made by repeating the same procedure except that PL-A was excluded from the ingredients set forth in Table 12. The physical properties of the dough of each group and the quality of each bread stored at 20° C. for 48 hours after its production are shown in Table 13.

TABLE 12

| Ingredient | (%) |
|---|---|
| high-gluten wheat flour | 87.61 |
| refined sugar | 4.00 |
| salt | 1.75 |
| shortening | 4.00 |
| yeast food (with ascorbic acid) | 0.10 |
| milk powder | 2.00 |
| defatted soybean meal | 0.50 |
| PL-A prepared in Ref. Ex. 1 | 0.04 |
| | (152 units/kg wheat |

TABLE 12-continued

| Ingredient | (%) |
|---|---|
| | flour) |

TABLE 13

| | control group | test group |
|---|---|---|
| Physical properties of dough | | |
| elasticity | | |
| extensibility | X | |
| non-stickiness | X | |
| moldability | Δ | |
| Bread quality | | |
| specific volume | 4.41 | 4.58 |
| film stretching in inner structure | X | |
| texture of inner structure | X | |
| flavor | Δ | Δ |
| relative staleness | 100 | 90 |

(Note) The same method of evaluation as in Ex. 1 was applied.

As in the sponge-dough process, the samples of the test group prepared by the straight process using the PL-A obtained in Reference Example 1 had better physical properties of dough and better bread quality than the control group.

EXAMPLE 7

The procedure of Example 1 was repeated except that the PL-A samples listed in Table 2 were replaced by one or two of the additives listed in Table 14. The physical properties of the dough of each test group and the quality of each bread stored at 20° C. for 48 hours after its production are shown in Table 15.

TABLE 14

| Test group | Additive | Amount (%) (to whole wheat flour) | PL-A (units/kg wheat flour) |
|---|---|---|---|
| I | No additive | | |
| II | PL-A (prepared in Ref. Ex. 1) | 0.04 | 152 |
| III | Monoglyceride (MG) | 0.2 | |
| IV | Calcium stearoyl lactylate (CSL) | 0.2 | |
| V | { PL-A | 0.04 | 152 |
| | MG | 0.2 | |
| VI | { PL-A | 0.04 | 152 |
| | CSL | 0.2 | |

TABLE 15

| | Test group | | | | | |
|---|---|---|---|---|---|---|
| | I | II | III | IV | V | VI |
| Physical properties of dough | | | | | | |
| elasticity | | | | Δ | | |
| extensibility | X | | X | | | |
| non-stickiness | Δ | | Δ | | | |
| moldability | Δ | | Δ | | | |
| Bread quality | | | | | | |
| specific volume | 4.56 | 4.72 | 4.61 | 4.69 | 4.74 | 4.78 |
| film stretching in inner structure | X | | Δ | | | |
| texture of inner structure | Δ | | Δ | | | |
| flavor | | | | | Δ | Δ |
| relative staleness | 100 | 92 | 93 | 93 | 85 | 75 |

The action of PL-A to improve the physical properties of dough and the quality of bread was further enhanced by using the enzyme in combination with MG or CSL.

EXAMPLE 8

According to the formulation shown in Table 16, the three types of Udon (wheat noodles) identified in Table 17 were prepared in the conventional manner.

TABLE 16

| Medium-gluten wheat flour | 9800 g |
|---|---|
| Table salt | 200 g |
| Water | 3300 g |

TABLE 17

| Udon test group | Additive | Amount (%) (to whole cereal flour) | PL-A (units/kg cereal flour) |
|---|---|---|---|
| I | No additive | | |
| II | Untreated pancreatin | 0.04 | 284 |
| III | PL-A (prepared in Ref. Ex. 1) | 0.08 | 304 |

As compared with the dough of test group I, the dough of test group III had rich elasticity and was excellent in extensibility, and when made into noodles, formed noodle bands without breakage to given noodle bands good in mechanical durability. On the other hand, the dough of test group II became too soft and even sticky, and was poorer in mechanical durability than the dough of test group I.

The obtained Udon (wheat noodles) were boiled at 98° C. for 10 minutes, cooled with running water, and the yield of each test group was measured. As shown in Table 18, the results are such that the noodles of test group III had the highest yield and test group II had the worst yield.

TABLE 18

| Udon (Wheat noodles) | Yield (%) |
|---|---|
| Test group I | 285 |
| II | 270 |
| III | 300 |

Further, after adding soup to the noodles, the palatability was evaluated by an experts' panel. The noodles of test group III was the best in the texture. On the contrary, the noodles of test group II was too soft and the worst in palatability.

EXAMPLE 9

Using the formulation of Table 19, the three types of Chinese noodles identified in Table 20 were produced in the conventional method.

TABLE 19

| Semihigh-gluten wheat flour | 9850 g |
|---|---|
| Brine (powder) | 100 g |
| Table salt | 50 g |
| Water | 3000 g |

TABLE 20

| Chinese noodles test group | Additive | Amount (%) (to whole cereal flour) | PL-A (units/kg cereal flour) |
|---|---|---|---|
| I | No additive | | |
| II | Untreated pancreatin | 0.04 | 284 |
| III | PL-A (prepared in Ref. Ex. 1) | 0.08 | 304 |

As pancreatin and PL-A, the same preparations as used in Example 8 were employed.

As compared with the dough of test group I, the dough of test III formed noodle bands higher in tensile strength and richer in elasticity without breakage of the noodle bands, and showed excellent in mechanical durability. On the contrary, the dough of test group II became noodle bands lacking elasticity, got stickiness and was poorer in mechanical durability than the dough of test group I.

The obtained Chinese noodles were boiled at 98° C. for 3 minutes and soup was added thereto. The palatability of each test group was evaluated by an experts' panel. After leaving them untouched at room temperature for an hour, the palatability was again evaluated. As a result, in either case, the Chinese noodles of test group III had the best texture and were the most excellent in elasticity. On the contrary, the Chinese noodles of test group II was the poorest in elasticity.

REFERENCE EXAMPLE 1

(Preparation of PL-A from Pancreatin)

Two hundred grams of swine pancreatin (by Miles Laboratories, Inc., U.S.A.) was dispersed in 800 ml of water with stirring. The resulting dispersion was adjusted to pH 3.5 with 4N, HCl, heated at 70° C. for 20 minutes, cooled and 200 g of lactose as a stabilizer was added thereto to prevent the inactivation of PL-A during the freeze-drying. Lyophilization was carried out to obtain a powder sample weighing 400 g.

Determination of the PL-A activity

The activity of PL-A was determined by measuring free fatty acids that were produced as a result of enzymatic reaction with a substrate made of a mixture of soybean phospholipids.

TABLE 21

| | |
|---|---|
| 0.1% (w/w) aqueous dispersion of PL-A (as prepared in Ref. Ex. 1) | 0.2 ml |
| 0.1 M aqueous CaCl$_2$ solution | 0.1 ml |
| 0.2 M acetic acid-sodium acetate buffer (pH 5.5) | 0.5 ml |
| Deionized water | 0.2 ml |

One ml of an enzyme solution having the composition indicated in Table 21 was preliminarily heated at 30° C. for 5 minutes. One ml of a substrate solution prepared by agitating a 2% (w/w) aqueous solution of SLP-White (by Turu Lecithin Corporation) with a high-speed homogenizer for 10 minutes was also subjected to preliminary heating at 30° C. The substrate solution was added to the enzyme liquor. An enzymatic reaction was carried out at pH 5.5 and 30° C. Exactly 10 minutes later, the reaction mixture was heated in boiling water for 15 minutes to discontinue the reaction, and the amount of free fatty acids contained in 20 μl of the reaction mixture was determined by Determiner NEFA (by Kyowa-Medex Co., Ltd.). The activity of PL-A was expressed in units, and one unit of PL-A is defined as the amount of the enzyme which forms one μmol of free fatty acids for one minute.

Determination of the protease activity

The activity of protease was determined by measuring the absorbance at 280 nm of a trichloroacetic acid soluble material that was produced as a result of the enzymatic reaction with casein as a substrate.

TABLE 22

| | |
|---|---|
| 0.5% (w/w) aqueous dispersion of pancreatin (as used in Ref. Ex. 1) | 0.2 ml |
| 0.2 M acetic acid-sodium acetate buffer (pH 5.5) | 0.5 ml |
| Deionized water | 0.3 ml |

One ml of an enzyme solution having the composition indicated in Table 22 was preliminarily heated at 30° C. for 5 minutes. One ml of a substrate solution prepared from a 1% (w/w) aqueous solution of casein (by Merck & Co., Inc.) was subjected to preliminary heating at 30° C. The substrate solution was added to the enzyme liquor to carry out an enzymatic reaction at pH 5.5 and 30° C. Exactly 10 minutes later, 3 ml of 5% (w/v) aqueous trichloroacetic acid solution was added to the reaction mixture to discontinue the reaction. The mixture was allowed to stand for 30 minutes and centrifuged, followed by a measurement of the absorbance of the supernatant at 280 nm. The activity of protease was expressed in units, and one unit of protease is defined as the amount of protease that increases the absorbance at 280 nm by "one" for one minute.

Determination of the Lipase Activity

The activity of lipase was determined by measuring free fatty acids produced by an enzymatic reaction using triglyceride as a substrate.

TABLE 23

| | |
|---|---|
| 0.1% (w/w) aqueous dispersion of pancreatin (as used in Ref. Ex. 1) | 0.2 ml |
| 0.1 M aqueous CaCl$_2$ solution | 0.1 ml |
| 1 M aqueous NaCl solution | 0.1 ml |
| 0.2 M aqueous sodium taurochlolate | 0.1 ml |
| 0.2 M acetic acid-sodium acetate buffer (pH 5.5) | 0.5 ml |

One ml of an enzyme liquor having the composition indicated in Table 23 was preliminarily heated at 30° C. for 5 minutes. One ml of a substrate solution was prepared by adding 0.4 ml of olive oil to 99.6 ml of a mixture of 0.4% (v/v) olive oil (by Yoshida Pharmaceutical Co., Ltd.) emulsion and 0.5% (w/w) aqueous gum arabic solution, and then stirring the mixture with a high-speed homogenizer for 10 minutes. The resulting substrate was also subjected to preliminary heating at 30° C. and added to the enzyme solution to carry out an enzymatic reaction which proceeded at pH 5.5 and 30° C. Exactly 10 minutes later, the reaction mixture was heated in boiling water for 15 minutes to discontinue the reaction. The amount of free fatty acids contained in 20 μl of the reaction mixture was determined by Determiner NEFA. The activity of lipase was expressed in units, and one unit is defined as the amount of lipase that forms 1 μmol of free fatty acids for one minute.

PL-A, Protease and Lipase Activity of PL-A Preparation of Ref. Ex. 1

The activities of PL-A, protease and lipase of pancreatin and PL-A preparation from pancreatin described in Ref. Ex. 1 are shown in Table 24.

TABLE 24

|  | PL-A activity (units/g) | Protease activity (units/g) | Lipase activity (units/g) |
| --- | --- | --- | --- |
| Before heating | 712 | 32 | 562 |
| After heating | 804 | 0.30 | 0 |
| After drying | 763 | 0.30 | 0 |

From the results of Table 24, protease and lipase as well as PL-A were contained in pancreatin before the heat treatment. Upon heat treatment, the activity of PL-A was slightly increased but the activities of protease and lipase became almost zero. When lactose was added as a stabilizer, the reduction in the activity of PL-A due to freeze-drying was negligible.

It is therefore concluded that by subjecting pancreatin to a heat treatment, PL-A enzyme samples substantially free from protease and lipase activities can be produced.

REFERENCE EXAMPLE 2

(Preparation of PL-D enzyme sample)

Raw carrot (2.94 kg) was crushed and pressed to extract 2,000 ml of juice. With ice-cooling, acetone (4,000 ml) cooled to $-20°$ C. in advance was gradually added to the juice, and the mixture was stirred with ice-cooling and centrifuged for 20 minutes at 8,000 rpm. The resulting precipitate was dissolved in 400 ml of water. The solution was stirred for 30 minutes with ice-cooling, and centrifuged for 20 minutes at 8,000 rpm. The resulting supernatant was dialyzed against water for 24 hours at 5° C. The dialyzate was freeze-dried to give 7.28 g of PL-D enzyme sample.

Determination of PL-D Activity

The activity of PL-D was determined by measuring choline produced by an enzymatic reaction using a mixture of soybean phospholipids as a substrate.

TABLE 25

| Aqueous solution of PL-D prepared in Ref. Ex. 2 | 0.2 ml |
| --- | --- |
| 0.1 M aqueous $CaCl_2$ solution | 0.2 ml |
| 0.2 M acetic acid-sodium acetate buffer (pH 5.5) | 0.5 ml |
| Deionized water | 0.1 ml |

One ml of an enzyme solution having the composition indicated in Table 25 was preliminarily heated at 36° C. for 5 minutes. One ml of a substrate prepared by stirring an 8% (w/w) aqueous SLP-White solution with a high-speed homogenizer for 10 minutes was also subjected to preliminary heating at 37° C. The substrate solution was added to the enzyme solution to carry out an enzymatic reaction which proceeded at pH 5.5 and 37° C. Exactly 5 minutes later, 0.5 ml of a reaction terminator [80 mM ethylenediaminetetraacetic acid disodium salt/1M tris-HCl buffer (pH 8.0)] was added to the reaction mixture in order to discontinue the reaction. The amount of choline contained in 20 $\mu$l of the reaction liquor was determined by Determiner-Ch-E (by Kyowa-Medex Co., Ltd.). The activity of PL-D was expressed in units, and one unit is defined as the amount of PL-D that forms 1 $\mu$mol of choline for one minute.

PL-D Activity of the PL-D enzyme sample prepared in Ref. Ex. 2

The PL-D activities of carrot juice and the PL-D enzyme sample prepared in Ref. Ex. 2 are shown in Table 26.

TABLE 26

|  | PL-D activity (units/g) | Yield (g) | Activity yield (%) |
| --- | --- | --- | --- |
| Carrot juice | 15.6 | 2,000 | 100 |
| PL-D enzyme sample prepared in Ref. Ex. 2 | 2940 | 7.28 | 69 |

By makeup procedures consisting of acetone treatment, dialysis and drying, the PL-D activity of carrot juice was enhanced by about 200 times, with the activity yield being 69%.

What is claimed is:

1. A bread improver composition which contains effective amounts of wheat flour and phospholipase A substantially free from lipase and protease the mixture improving the quality of dough and bread.

2. A process for producing bread which comprises the steps of adding, in advance, an effective amount of phospholipase A substantially free from lipase and protease to the ingredients of dough and kneading the dough.

3. An improved process for making bread which comprises mixing phospholipase A substantially free from lipase and protease with the ingredients of bread dough including wheat flour, baker's yeast and water in the amount of 10 to 5000 units of phospholipase A per kg of the wheat flour and then kneading the resulting admixture to provide a bread dough having improved extensibility, non-stickiness and moldability.

4. The process according to claim 3 which further comprises allowing the kneaded dough to rest for a period sufficient to effect fermentation and to cause the bread dough to rise to a predetermined height and then baking the bread dough at an elevated temperature.

5. A dough for making bread which comprises wheat flour, salt, sugar, shortening and yeast food to which has been added phospholipase A substantially free from lipase and protease in an amount of 10 to 5000 units per kg of the wheat flour.

6. A composition according to claim 5 which further comprises from 100 to 5000 units of phospholipase D per kg of the wheat flour.

7. A cereal-based food, other than bread, improver composition which contains phospholipase A substantially free from lipase and protease in an amount more than 150 units per kg of cereal flour.

8. A dough for making cereal-based food, other than bread, which comprises cereal flour and salt to which has been added phospholipase A substantially free from lipase and protease in an amount of 150 to 5000 units per kg of the cereal flour.

* * * * *